(12) United States Patent
Wawro

(10) Patent No.: US 10,828,737 B2
(45) Date of Patent: Nov. 10, 2020

(54) UNIVERSAL TOOL HOLDER

(71) Applicant: Ryszard Wawro, Lindenhurst, NY (US)

(72) Inventor: Ryszard Wawro, Lindenhurst, NY (US)

(73) Assignee: Canine Clamps, Inc., Lindenhurst, NY (US)

( * ) Notice: Subject to any disclaimer, the term of this patent is extended or adjusted under 35 U.S.C. 154(b) by 84 days.

(21) Appl. No.: 16/234,002

(22) Filed: Dec. 27, 2018

(65) Prior Publication Data

US 2019/0202013 A1 Jul. 4, 2019

Related U.S. Application Data

(60) Provisional application No. 62/610,926, filed on Dec. 27, 2017.

(51) Int. Cl.
*B25B 11/00* (2006.01)
*B23Q 1/48* (2006.01)
*B25B 5/00* (2006.01)

(52) U.S. Cl.
CPC .............. *B23Q 1/4809* (2013.01); *B25B 5/00* (2013.01)

(58) Field of Classification Search
CPC .... B25B 1/00; B25B 1/20; B25B 1/12; B25B 5/00; B25B 11/00; B25B 11/02; B23Q 3/00; B23Q 3/06; B23P 19/06; B23P 19/10
See application file for complete search history.

(56) References Cited

U.S. PATENT DOCUMENTS

| | | | |
|---|---|---|---|
| 1,490,063 A | 4/1924 | Tower | |
| 2,882,656 A | 4/1959 | Novkov | |
| 2,969,817 A | 1/1961 | Zabich | |
| 3,981,605 A * | 9/1976 | Wirsing | B23B 41/00 408/88 |
| 4,108,589 A | 8/1978 | Bunch | |
| 4,283,977 A * | 8/1981 | Batson | B23D 47/04 269/203 |
| 4,552,345 A * | 11/1985 | Benda | B25B 5/003 269/113 |
| 5,224,692 A * | 7/1993 | Anderson | B23Q 1/545 269/167 |
| 5,735,513 A | 4/1998 | Tofflon | |
| 5,816,568 A | 10/1998 | Fox | |
| 6,068,543 A * | 5/2000 | Renn | B23D 59/007 29/26 A |
| 7,044,460 B2 | 5/2006 | Bolton | |
| 8,066,270 B2 * | 11/2011 | Siegel | B25B 1/2452 269/272 |
| 8,167,292 B1 | 5/2012 | Mucciacciaro | |
| 8,210,510 B2 | 7/2012 | Li | |
| 8,387,222 B2 | 3/2013 | Chen | |
| 9,364,934 B2 | 6/2016 | Wawro | |

(Continued)

*Primary Examiner* — Lee D Wilson
(74) *Attorney, Agent, or Firm* — The Farrell Law Firm, P.C.

(57) ABSTRACT

A universal tool holder configured for use with a machine tool is provided. The universal tool holder may be used for securing the machine tool in a relatively fixed orientation; for mounting and dismounting modular tools for milling and lathe computer numerical controls (CNC); and for assembling extension adaptors, reduction adapters, front clamp adapters, cutters, and other similar tools.

15 Claims, 5 Drawing Sheets

(56) References Cited

U.S. PATENT DOCUMENTS

| | | | |
|---|---|---|---|
| 2004/0140602 A1* | 7/2004 | Gerritsen | B25B 5/068 269/6 |
| 2010/0327504 A1* | 12/2010 | Seidel | B25B 5/102 269/43 |
| 2014/0363252 A1 | 12/2014 | Wawro | |
| 2016/0250729 A1 | 9/2016 | Wawro | |
| 2019/0202013 A1* | 7/2019 | Wawro | B23Q 1/4809 |

* cited by examiner

Section view A-A

Section view C-C

UNIVERSAL TOOL HOLDER

PRIORITY

This application is based on and claims priority under 35 U.S.C. § 119(e) to U.S. Provisional Patent Application Ser. No. 62/610,926 filed on Dec. 27, 2017, the entire disclosure of which is incorporated herein by reference.

BACKGROUND

1. Field of the Invention

The present disclosure relates, generally, to a universal tool holder, and more particularly, to a universal tool holder that is configured to hold a machine tool during a conversion process thereof from one size to another.

2. Description of the Related Art

Machine tool holders (and/or systems) that are configured to convert machine tools (e.g., precision milling tools used in conjunction with multi-task machines, machining centers with turning capability, and vertical lathes) from one size to another are known. Companies that use such holders, typically, have to maintain an inventory of shims and spacers to accommodate the various sizes of the machine tools for which they are configured to hold during a conversion process. In addition, as companies may require more than one machine tool holder to accommodate a specific size of the machine tools, this can result in additional costs and an increased footprint on a shop floor.

While such holders/systems are suitable for their intended purpose, there exists a need for a holder/system that is simple to use and that can accommodate the various sizes of machine tools.

SUMMARY

In view of the above, a universal tool holder that is configured to hold a machine tool for quick conversion of the machine tool from one size to another would prove advantageous in the precision machining tool industry.

In accordance with an aspect of the present disclosure, there is provided a universal holder configured for use with a machine tool. The universal holder includes a base, a clamp assembly supported on the base for securing the machine tool in a relatively fixed orientation and a locking assembly supported on the base and movable along a horizontal axis defined therethrough for lockingly engaging the machine tool when it is positioned on the base.

In accordance with an aspect of the present disclosure, there is provided a universal holder configured for use with a machine tool. The universal holder includes a base supporting a clamp assembly including a clamp movable along vertical and horizontal axes defined through the base and a locking assembly movable along the horizontal axis. A first locking blade provided on the base and a second locking blade provided on the locking assembly are aligned with each other and configured to lockingly engage corresponding grooves defined on the machine tool.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

As used herein, the term "proximal" refers to a location on the on the universal holder, during normal use, that is closest to the user using the device. Conversely, the term "distal" refers to a location on the on the universal holder, during normal use, that is farthest from the user using the device.

Figure 1:
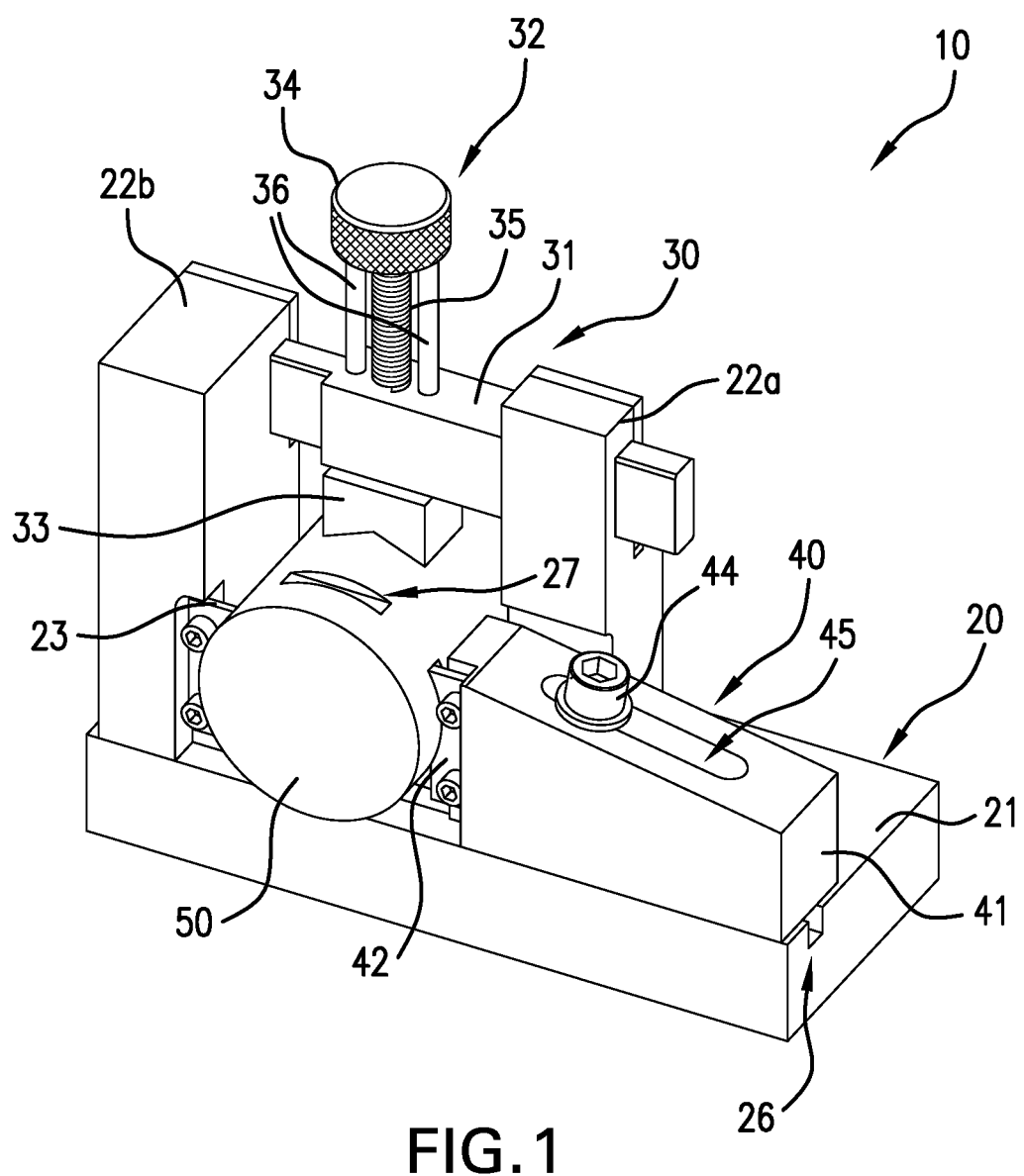
FIG. 1 is a perspective view of a universal holder, in accordance with an embodiment of the present disclosure.

FIG. 1 is a perspective view of a universal holder 10 (holder 10), in accordance with an embodiment of the present disclosure. The holder 10 includes a base 20, a clamping assembly 30, and a locking assembly 40. The components of the holder 10 can be made from any suitable material including, but not limited to, metal, metal alloys, plastic, ceramic, etc.

Figure 2:
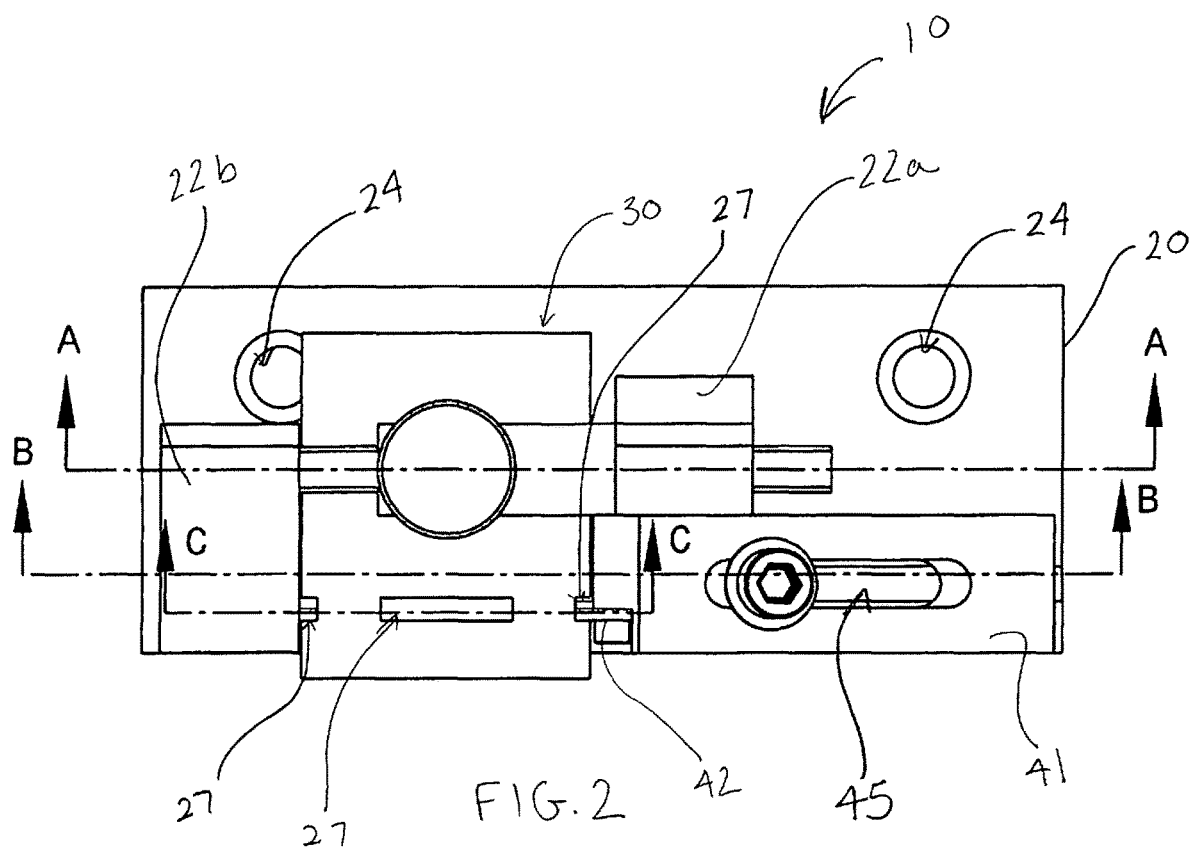
FIG. 2 is a top view of the universal holder.

The base 20 includes a generally rectangular configuration and supports on a top surface 21 thereof the clamping assembly 30 and the locking assembly 40. During a conversion process of a machine tool 50, the base 20 is also configured to support the machine tool 50. Two mounting apertures 24 (FIG. 2) are defined through the base 20 and can be used to secure the holder 10 to a workbench surface.

Extending from the top surface 21 of the base 20 are two opposing vertical support members 22a and 22b. The vertical support members 22a and 22b can be affixed to the base 20 via any suitable affixation device, e.g., screws, nuts, bolts, etc. Conversely, the vertical support members 22a and 22b and the base 20 can be formed as a single component.

Figure 3:
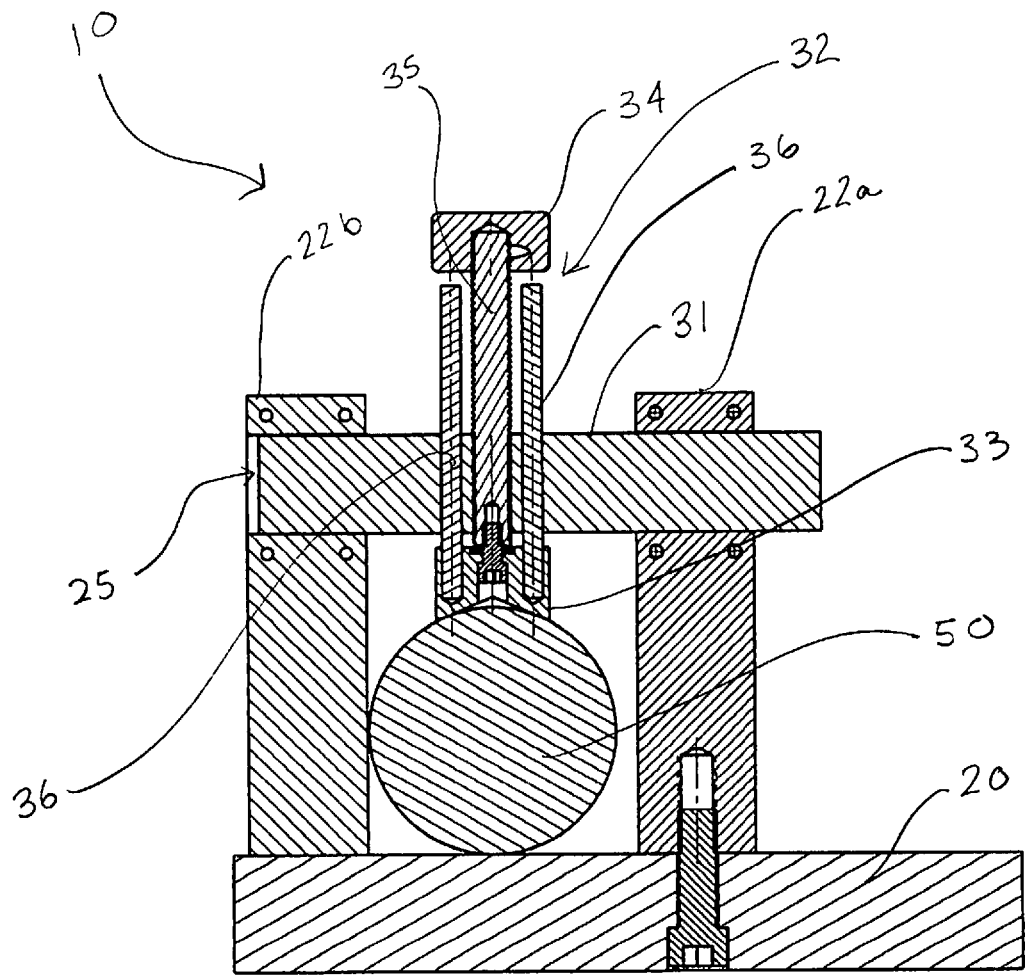
FIG. 3 is a cross-sectional view of the universal holder taken along line A-A of FIG. 2.

The vertical support members 22a and 22b are configured to support the clamping assembly 30. More particularly, the vertical support members 22a and 22b each include an aperture 25 (a portion of the aperture 25 of vertical support member 22b is shown in FIG. 3) that is configured to receive an end of a horizontal bar member 31 of the clamping assembly 30. The apertures 25 allow the horizontal bar member 31 to be moved along a horizontal axis defined through the base 20, in between and relative to the vertical support members 22a and 22b.

Coupled to the horizontal bar member 31 is a clamp 32 which includes a distal end 33 (e.g., a clamping end) having a generally arcuate configuration for engaging the machine tool 50, a proximal end 34 that is rotatable by a user (e.g., a knurled knob, or other suitable type of turning device), and a threaded rod 35 that is connected to the distal end 33 and the proximal end 34. The threaded rod 35 is configured to engage a threaded aperture defined through the horizontal bar member 31. It is noted that since the threaded rod 35 is shown received within the threaded aperture, the threaded aperture is not explicitly shown in the FIGS.

One or more guide members 36 are positioned through corresponding apertures on the horizontal bar member 31, and are connected to the distal end 33 of the clamp 32 to prevent the distal end 33 from turning while the proximal end 34 is rotated to move the clamp 32 up and down along a vertical axis that is defined through the base 20. It is noted that since the one or more guide members 36 are shown received within the corresponding apertures, the corresponding apertures are not explicitly shown in the FIGS.

Figure 4:
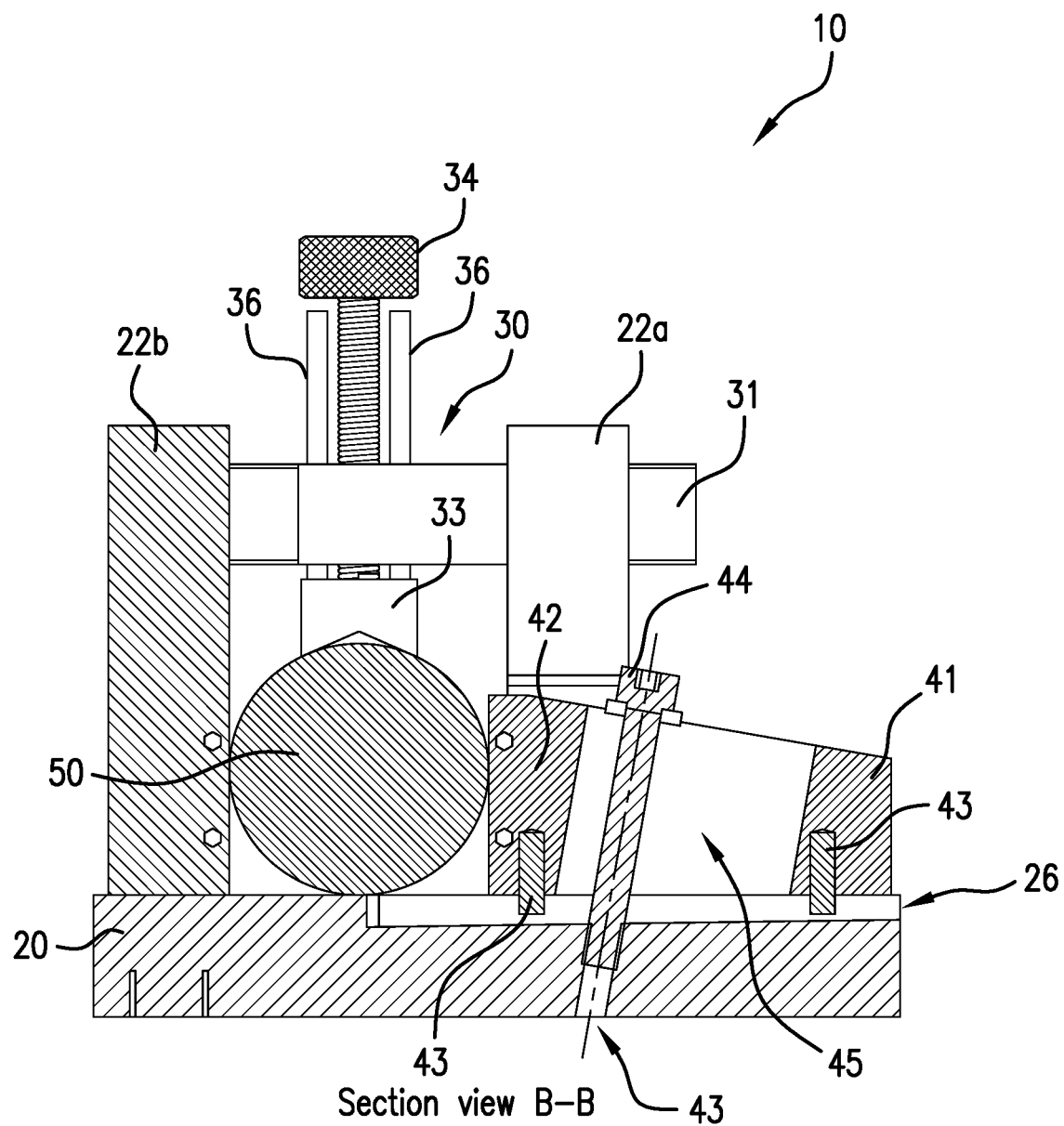
FIG. 4 is a cross-sectional view of the universal holder taken along line B-B of FIG. 2.
Figure 5:
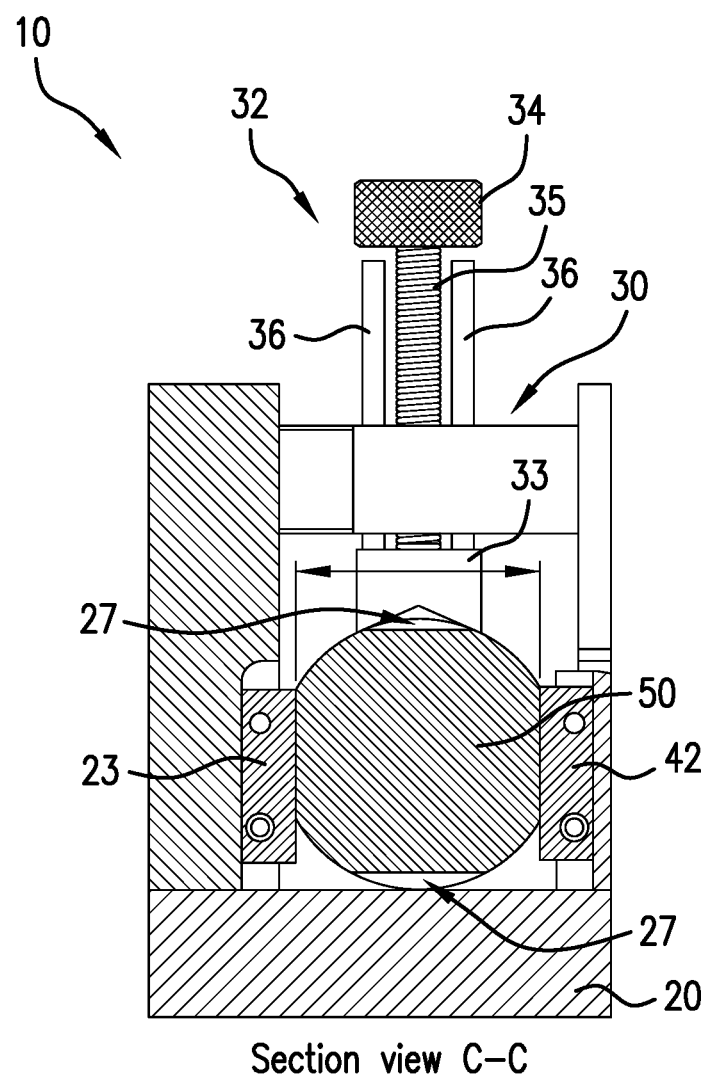
FIG. 5 is a cross-sectional view of the universal holder taken along line C-C of FIG. 2.

The locking assembly 40 includes a wedge 41 that is movable along the horizontal axis, a locking blade 42, a pair of guide members 43 (FIG. 4), and a threaded locking pin 44. The locking blade 42 is affixed to the wedge 41 via one or more screws (two screws shown in the FIGS.) and is aligned with a locking blade 23 that affixed to the vertical support member 22*b* in a similar manner as the locking blade 42. The locking blade 42 of the wedge 41 and the locking blade 23 of the vertical support member 22*b* are configured to engage corresponding grooves 27 (FIGS. 1, 2, and 5) provided on the machine tool 50, described in greater detail below.

The pair of guide members 43 extend from a bottom surface of the wedge 41 (FIG. 4) and are positioned within a corresponding slot 26 (FIGS. 1 and 4) defined through the base 20. The pair of guide members 43 facilitate movement of the wedge 41 along the horizontal axis defined through the base 20, and the threaded locking pin 44, which is positioned at any angle within a slot 45 of the wedge 41, is configured to engage a corresponding threaded aperture 43 (FIG. 4) of the base 20 when the locking blade 42 of the wedge 41 is moved into engagement with the groove on the machine tool 50.

The threaded locking pin 44 can have a knurled knob at its proximal end, or other suitable device that can be used to turn the locking pin 44, e.g., a proximal that is configured to receive a hex key, Allen key, or Allen wrench. Moreover, the proximal end of the locking pin 44 has diameter that is greater than a diameter of the slot 45.

The wedge 41 includes a bottom surface that is straight for sliding along the top surface 21 of the base 20 and a top surface that is slanted, though the top surface can also be straight.

Operation of the holder 10 will now be described. In the following description, it is assumed that the machine tool 50 is a milling tool.

In use, a user can place the milling tool between the wedge 41 of the locking assembly 40 and the vertical upright support 22*b*. If required, using the proximal end 34 of the clamp 32, the user can adjust the clamp 32 upwards/downwards and the wedge 41 can be moved along the horizontal axis to accommodate a specific size of the milling tool.

Once the milling tool is positioned within the holder 10, the user can rotate the milling tool to align one of the plurality of grooves 27 that are provided on the milling tool with the locking blade 23 of the vertical upright support 22*b* and the locking blade 42 of the wedge 41. The user can move the locking blade 23 into engagement with one of the grooves 27 on the milling tool, can move the locking blade 42 of the wedge 41 into engagement with another one of the grooves 27 on the milling tool (FIG. 5), and can move the locking pin 44 within the slot 45 of the wedge to align the locking pin 44 with the threaded aperture 43.

Once aligned the user can hand tighten the locking pin 44 into the threaded aperture 43 to lock the wedge 41 into place, thereby securing the milling tool to the holder 10. The user can also hand tighten distal end 33 of the clamp 32 onto the milling tool by rotating the proximal end 34 of the clamp 32. In this tighten configuration, a user can then proceed with the conversion process of the milling tool.

In accordance with the present disclosure, the holder 10 overcomes the aforementioned shortcoming of conventional machine tool holders. More particularly, the holder 10 allows for a conversion of tools with different lengths, diameters, and design characteristics regardless of a particular machine interface (e.g., SK, HSK, Big Plus, etc.), which can reduce set-up and tool change time of machine tools, thereby leading to significantly increased machine utilization and decreased costs associated therewith.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. A universal tool holder configured for use with a machine tool, the universal holder comprising:
   a base;
   a clamp assembly supported on the base for securing the machine tool in a relatively fixed orientation; and
   a locking assembly supported on the base and movable along a horizontal axis defined therethrough for lockingly engaging the machine tool when the machine tool is positioned on the base,
   wherein the base includes two vertical support members for supporting the clamp assembly in an upright configuration,
   wherein one of the two vertical support members includes a first locking blade, and
   wherein the locking assembly includes a wedge movable along the horizontal axis, and wherein the wedge includes a second locking blade, a pair of guide members, and a threaded locking pin.

2. The universal tool holder according to claim 1, wherein the clamp assembly includes:
   a horizontal bar member positioned within the two vertical support members and movable relative thereto; and
   a clamp coupled to the horizontal bar member and including a distal end having a generally arcuate configuration for engaging the machine tool, a proximal end rotatable by a user, and a threaded rod connected to the distal end and proximal end and configured to engage a threaded aperture defined through the horizontal bar member,
   wherein rotation of the proximal end moves the clamp along a vertical axis.

3. The universal tool holder according to claim 2, wherein the clamp assembly further includes at least one guide member positioned through at least one corresponding aperture on the horizontal bar member, and wherein the at least one guide member is configured to prevent the distal end of the clamp from turning while the proximal end is rotated.

4. The universal tool holder according to claim 1, wherein the pair of guide members extend from a bottom surface of the wedge and are positioned within a corresponding slot defined through the base.

5. The universal tool holder according to claim 4, wherein the first locking blade and the second locking blade are configured to engage corresponding grooves provided on the machine tool.

6. The universal tool holder according to claim 1, wherein the threaded locking pin is positioned within a slot defined through the wedge and configured to engage a corresponding threaded aperture defined through the base.

7. The universal tool holder according to claim 1, wherein the wedge includes a bottom surface that is straight and a top surface that is slanted.

8. The universal tool holder according to claim 1, wherein the machine tool is a milling tool.

9. A universal tool holder configured for use with a machine tool, the universal holder comprising:
- a base supporting a clamp assembly including a clamp movable along vertical and horizontal axes defined through the base and a locking assembly movable along the horizontal axis,
- wherein a first locking blade provided on the base and a second locking blade provided on the locking assembly are aligned with each other and configured to lockingly engage corresponding grooves defined on the machine tool,
- wherein the base includes two vertical support members for supporting the clamp assembly in an upright configuration, and
- wherein one of the two vertical support members includes the first locking blade.

10. The universal tool holder according to claim 9, wherein the clamp assembly further includes a horizontal bar member positioned within the two vertical support members and movable relative thereto,
- wherein the clamp is coupled to the horizontal bar member and includes a distal end having a generally arcuate configuration for engaging the machine tool, a proximal end rotatable by a user, and a threaded rod connected to the distal end and proximal end and configured to engage a threaded aperture defined through the horizontal bar member, and
- wherein rotation of the proximal end moves the clamp along a vertical axis.

11. The universal tool holder according to claim 10, wherein the clamp assembly further includes at least one guide member positioned through at least one corresponding aperture on the horizontal bar member, and wherein the at least one guide member is configured to prevent the distal end of the clamp from turning while the proximal end is rotated.

12. The universal tool holder according to claim 9, wherein the locking assembly includes a wedge that is movable along the horizontal axis, and wherein the wedge includes the second locking blade, a pair of guide members, and a threaded locking pin.

13. The universal tool holder according to claim 12, wherein the pair of guide members extend from a bottom surface of the wedge and are positioned within a corresponding slot defined through the base.

14. The universal tool holder according to claim 12, wherein the threaded locking pin is positioned within a slot defined through the wedge and configured to engage a corresponding threaded aperture defined through the base.

15. The universal tool holder according to claim 12, wherein the wedge includes a bottom surface that is straight and a top surface that is slanted.

* * * * *